(12) United States Patent
Schmidt et al.

(10) Patent No.: US 6,353,174 B1
(45) Date of Patent: Mar. 5, 2002

(54) METHOD AND APPARATUS FOR FACILITATING GROUP MUSICAL INTERACTION OVER A NETWORK

(75) Inventors: Dan Schmidt, Cambridge; Jonathon Bell, Brookline; Eran Egozy, Cambridge; Michael James, Somerville; Greg LoPiccolo, Brookline; Alexander Rigopulos, Arlington, all of MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 0 days.

(21) Appl. No.: 09/459,737

(22) Filed: Dec. 10, 1999

(51) Int. Cl.[7] .............................. G10H 7/00; G06F 15/16
(52) U.S. Cl. .............................. 84/609; 84/600; 84/645; 709/200; 709/201; 709/204; 709/217; 709/231
(58) Field of Search .................... 84/600–602, 609–612, 84/622–625, 634–636, 645; 707/205; 709/200–207, 213, 217–219, 223–226, 230–232, 241; 370/413

(56) References Cited

U.S. PATENT DOCUMENTS

| | | | |
|---|---|---|---|
| 5,054,360 A | 10/1991 | Lisle et al. | 84/645 |
| 5,393,926 A | 2/1995 | Johnson | 84/610 |
| 5,689,641 A | * 11/1997 | Ludwig et al. | 709/241 |
| 5,916,302 A | * 6/1999 | Dunn et al. | 709/204 |

OTHER PUBLICATIONS

The Distributed Real–Time Groove Network (DRGN), Matthew D. Moller and Canton Becker, 1995.*

* cited by examiner

Primary Examiner—Marlon T. Fletcher
(74) Attorney, Agent, or Firm—Testa, Hurwitz & Thibeault, LLP

(57) ABSTRACT

Described are a system and method for achieving near real-time musical collaboration by a group of users using computers connected by a network. Each computer system plays a stream of musical data to each user. The musical data stream played to each user corresponds to the musical collaboration produced by the users. The playing of the musical data streams is staggered such that each user is located at a different time in the musical collaboration than every other user. This staggering separates any two users by a temporal offset that exceeds the maximum time required to transmit musical data from one user to another user over the network. Each user is allowed to modify the portion of the musical data stream that is currently being played to that user. Such musical data modifications are transmitted to other users over the network to become incorporated into the musical data streams played to those other users. Because the musical data streams are staggered by a temporal offset that exceeds the maximum latency of the network, those other users to receive the musical data modifications with sufficient time to incorporate them into the locally played musical data streams.

34 Claims, 9 Drawing Sheets

METHOD AND APPARATUS FOR FACILITATING GROUP MUSICAL INTERACTION OVER A NETWORK

FIELD OF THE INVENTION

This invention relates to electronic music systems and, more particularly, to an electronic music system by which a group of musicians connected by a network achieve musical collaboration in "near real time."

BACKGROUND OF THE INVENTION

Music is a temporal medium, the organization of sound in time. Accordingly, music making is highly timing sensitive. When a musician presses a key on a piano, the musician expects the result to be immediately audible. Any delay in hearing the sound, even as brief as few milliseconds, produces a perceived sluggishness that impedes the ability of the musician to use the instrument.

Music making is also often a collaborative effort among many musicians who interact with each other. With the advent of the Internet, musicians have sought ways to collaborate and interact with each other from remote locations. A primary inadequacy of the Internet for such purposes, however, is the inherent latency of data transmissions over the network. Such latency often exceeds hundreds or thousands of milliseconds, which is far beyond the threshold of tolerable real-time musical interaction.

Therefore, a need exists for a system and method that enable musicians to achieve near real-time musical collaboration over a high-latency network, such as the Internet.

SUMMARY OF THE INVENTION

It is an object of the invention to provide a system and method that a group of users connected to a network can use to collaborate upon a task in near real time. It is a further object of the invention to enable the group of users to achieve near real-time musical collaboration.

In general, in one aspect, the invention features a method for achieving near real-time musical collaboration. A stream of musical data is played to each user. Each musical data stream represents the musical collaboration upon which the users are collaborating. In some embodiments of the invention, the playing of each musical data stream to each user occurs automatically, repetitiously, or both.

Each user is allowed to modify the musical data of the musical data stream as that musical data are played to that user. During the playing of the musical data stream, each user may add, delete, or modify musical data of that musical data stream. Any musical data modifications made by one of the users are transmitted to another user over the network.

The playing of the musical data streams are staggered such that each user is located at a different time in the musical collaboration, and thus in the musical data stream played to that user, than every other user. In one embodiment, the staggering of the musical data streams separates any two users by a temporal offset that exceeds the maximum time required to transmit musical data modifications from one user to another user over the network. The length of the temporal offset ensures that the destination computer will receive the transmitted modifications in time to incorporate the modifications into the musical data stream played by that computer.

In one embodiment, the musical data modifications made by one user are transmitted to every other user in a broadcast is fashion. In another embodiment, the modifications pass from user to user in peer-to-peer communication. In still another embodiment, the musical data modifications made by one user are transmitted to another user through a server.

In another aspect, the invention relates to method for achieving near real-time collaboration on a task by a plurality of users connected by a network. A stream of data representing the collaboration is output to each user. The outputting of the data streams is staggered such that each user is located at a different time in the collaboration, and thus in the data stream played to that user, than every other user. Each user can modify the data of the data stream as that data are output to that user. Data modifications made by one of the users are transmitted to another user over the network.

In still another aspect, the invention relates to system for achieving near real-time musical collaboration by a plurality of users connected by a network. In general, the system includes a plurality of computers connected by a network. Each computer has an output system playing a stream of musical data representing the musical collaboration to a user of that computer and an input system by which the user of that computer modifies the musical data as the output system plays that musical data. Each computer also has a transmitter that transmits the musical data modifications to another computer over the network. The computers of the system stagger the playing of the musical data streams such that each computer plays musical data located at a different time in the musical collaboration than every other computer. In one embodiment, the input system includes a MIDI instrument. In another embodiment, the output system includes a MIDI synthesizer.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
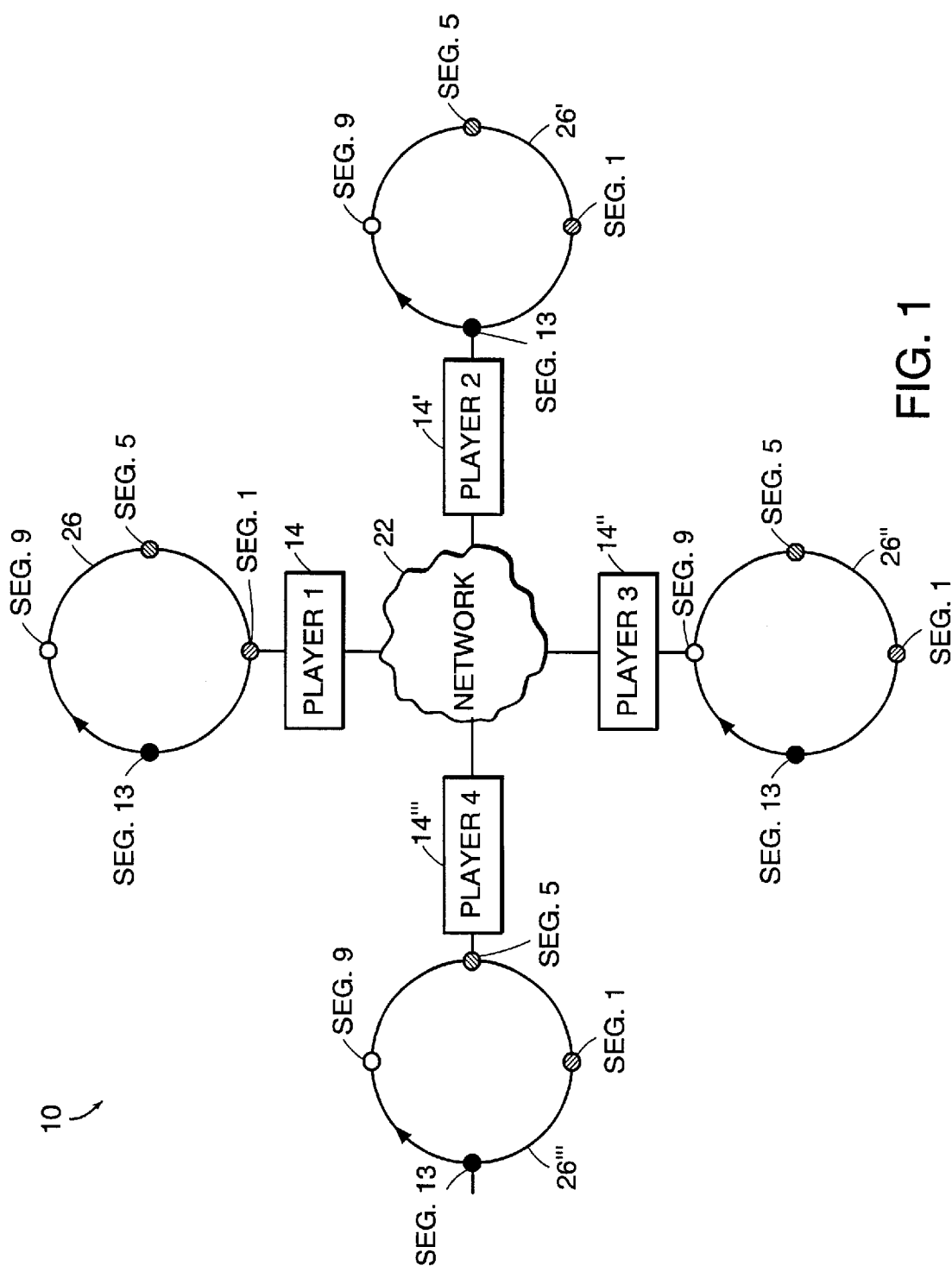
FIG. 1 is a block diagram of an embodiment of a music system by which users of computer systems can collaboratively achieve near real-time musical collaboration over a network according to the principles of the invention.

Referring to FIG. 1, a music system 10 embodying the invention enables a group of players, here players 1–4, to engage in near real-time musical collaboration over a network 22. The music system 10 includes a plurality of computer systems 14, 14', 14'', 14''' (generally, computer 14) connected to the network 22. The network 22 can be any kind of network, such as a local area network (LAN), a wide area network (WAN), the Internet, or the World Wide Web. The computers 14 connect to the network 22 through one of a variety of connections including standard telephone lines, LAN or WAN links (e.g., T1, T3, 56 kb, X.25), broadband connections (e.g., ISDN, Frame Relay, ATM), and wireless connections.

In brief overview, during operation of the music system 10, each player contributes in real time to the musical collaboration over the network 22 through a respective one of the computers 14. Each computer 14 automatically plays a musical data stream representing the musical collaboration to the player using that computer. Playing the musical data stream produces music for that player to hear. As described in more detail below, each player typically hears a different version of the musical collaboration than every other player. Accordingly, FIG. 1 uses distinct reference numerals (here, 26, 26', 26'', 26'''; generally, 26) to identify the different musical data streams.

As each computer 14 plays the corresponding musical data stream 26, each player musically interacts with the played music in real time through that computer 14. This interaction modifies the musical data stream played to that player. Each computer 14 then transmits the modifications to one or more other computers over the network 22. Each targeted computer receives the modifications in time to incorporate such modifications into the musical data stream that that computer is currently playing to the respective player. Thus, the music that the computer 14 is currently playing to a given player is a combination of the current interaction of that player to the playing music and any modifications to that playing music received from the other players.

Figure 2:
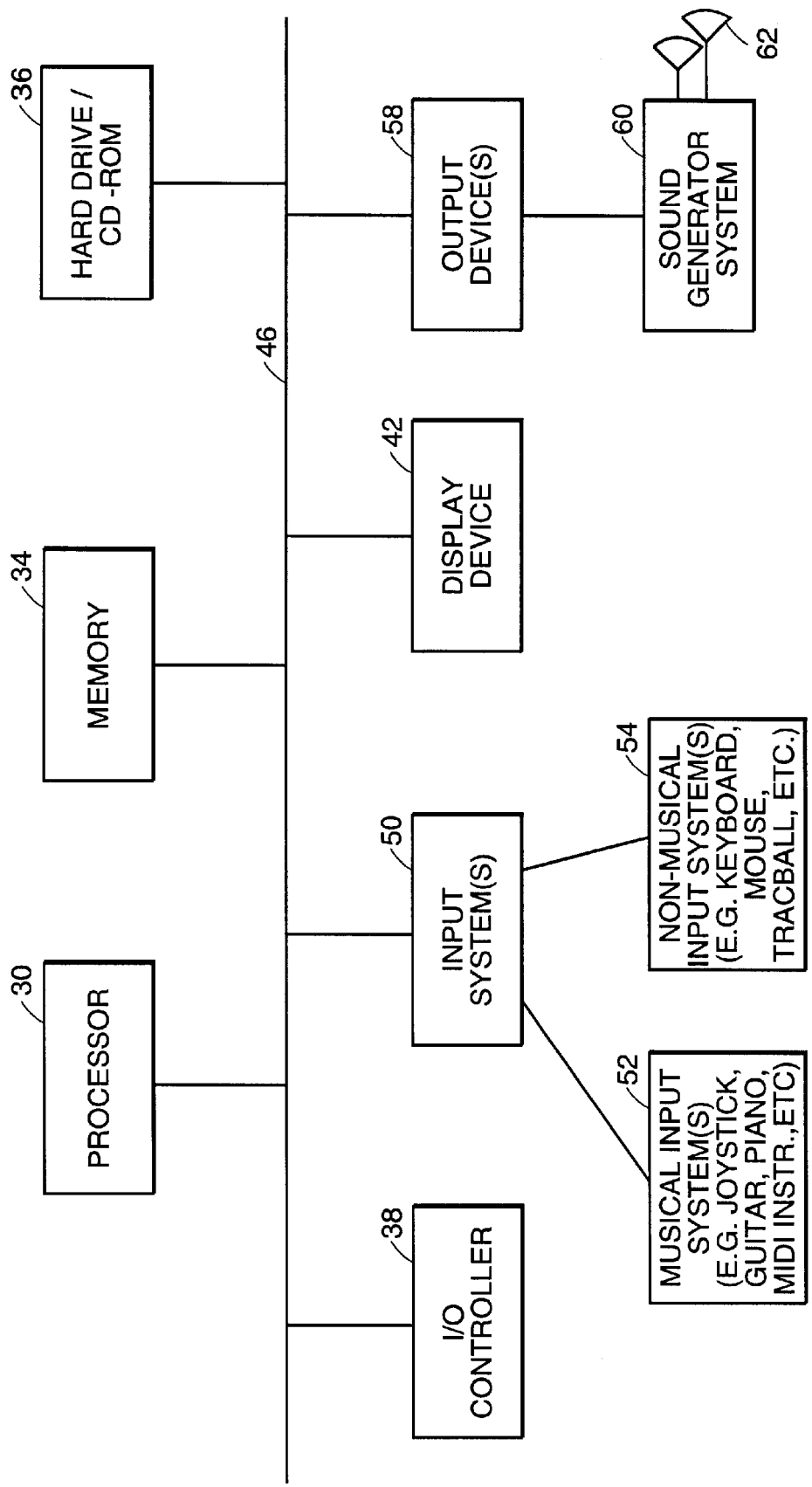
FIG. 2 is a block diagram of an exemplary embodiment of each computer system of the music system.

Referring to FIG. 2, each computer 14 typically includes a central processor 30, a main memory unit 34 for storing programs and/or data, a hard drive/CD-ROM 36, an input/output (I/O) controller 38, a display device 42, and a bus 46 for conveying data, address, and control signals among these components. The memory 34 includes random access memory (RAM) and read only memory (ROM).

Each computer 14 also has one or more input systems 50, which include musical 52 and non-musical 54 input systems. Musical input systems 52 include any musical input device that a player can use to add, alter, or remove music from the locally playing musical data stream 26. Examples of such musical input devices include an alphanumeric keyboard, a mouse, a joystick, a game pad (also called a joy pad), musical keyboard, or a conventional musical instrument, e.g., a guitar, a MIDI instrument, etc. The musical input system 52 converts the musical input of the player into musical data that are incorporated into the locally playing musical data stream 26.

Embodiments of the format of the musical data vary. In general, the musical data can have any format, whether standard or proprietary (i.e., non-standard), for representing music. In one embodiment, the musical data are formatted according to the MIDI (Musical Instrument Digital Interface) standard digital language. In another embodiment, the musical data are digital audio data converted from analog audio signals. In yet another embodiment, the musical data have a proprietary format for representing musical information.

Non-musical user input systems 54 include any input device through which the player can supply commands to set up and configure the computer 14, such as an alphanumeric keyboard, a mouse, and a trackball.

Each computer 14 also has one or more output systems 58, including a sound generator 60 for generating signals representative of audible music and speakers 62 for broadcasting the signals to the player. The electronic hardware needed to generate these audio signals can reside inside the computer 14, or operate in a separate box external to the computer 14. Also, the sound generator 60 generates the signals either in hardware or software running on the computer 14. To produce audio signals from MIDI-formatted musical data, the sound generator 60 is, for example, a MIDI tone generator or other synthesis device. In those embodiments wherein the musical data are digital audio data, the sound generator 60 includes a digital-to-analog converter. The signals generated by the sound generator 60 typically require amplification for broadcasting by the speakers 62. Hardware internal or external to the computer 14 can accomplish the amplification and broadcasting.

In one embodiment, one or more computer programs written in a programming language (e.g., C, C++, etc.) define the operational capabilities of the music system 10. These software programs can be loaded onto the hard drive 36 and/or into the memory 34 of the computer 14. Each player causes the music system 10 to run according to the principles of the invention by double-clicking the appropriate icon on the display device 42. The software program(s) and the data used by the software program(s) are stored on one or more of the computer's storage mediums such as the hard drive/CD-ROM 36, etc. In general, the software programs implement the invention and contain or access the data needed to implement the functionality of the invention.

Figure 3:
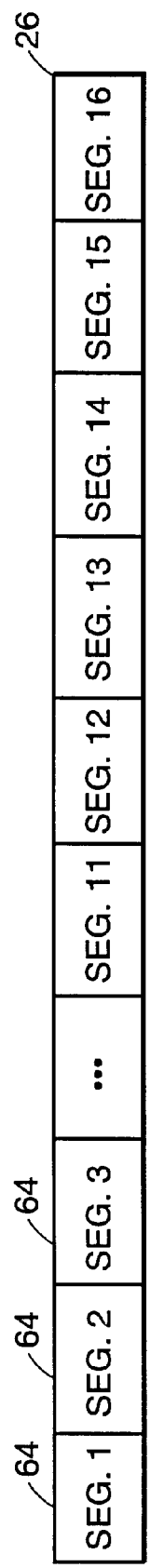
FIG. 3 is a block diagram of an exemplary representation of an embodiment of the musical data streams played by the computer systems.

FIG. 3 shows an exemplary representation of an embodiment of each musical data stream 26. As shown, each musical data stream 26 is represented as a sequence of temporally ordered segments 64 of musical data. Such segments 64 can have any temporal length. For example, segments 64 of one embodiment are one musical measure in length. Typically, each segment 64 of the musical data stream 26 is equal in length to every other segment, but the principles of the invention work also to segments of unequal lengths within the musical data stream 26.

Each segment 64 occupies a particular temporal position in the sequence. In the exemplary embodiment shown, the musical data stream 26 has sixteen segments 64 of musical data. A number identifies the relative position of each segment 64 in the temporal sequence (e.g., segment 1 identifies the first segment 64 and segment 16 identifies the last segment in the musical data stream 26). Computers 14 play lower numbered segments before playing higher numbered segments. For example, each computer 14 plays segment 1 before segment 2, segment 2 before segment 3, etc. It is to be understood that the numbering of segments 64 is for facilitating the description of the invention and that the actual numbers assigned to segments 64 are arbitrary.

The music system 10 maintains an association between similarly numbered segments of the musical data streams 26 throughout the collaborative development of the musical collaboration. That is, segment 1 of musical data stream 26 is associated with segment 1 of each of the other musical data streams 26', 26'', and 26'''. Similar associations exist for each of the other numbered segments. Generally, therefore, two associated segments in the data streams played to two players correspond to the same interval of time in the musical collaboration.

One characteristic of such segment associations is that associated segments are equal in temporal length. Accordingly, each segment 1 of the musical data streams 26, 26', 26", and 26'" has the same temporal length as every other segment 1, each segment 2 has the same temporal length as every other segment 2, etc.

Another characteristic of such segment associations is that modifications made to the musical data of a given segment of one musical data stream (e.g., 26) can be incorporated in the musical data of the associated segments in the other musical data streams (e.g., 26', 26", 26'"), as described in more detail below. For example, modifications made by player 1 to the musical data of segment 1 of the musical data stream 26 are heard by player 2 when the computer 14' plays segment 1 of the musical data stream 26'.

Another characteristic of such segment associations is that the music produced by playing the musical data of associated segments is similar.

Figure 4:
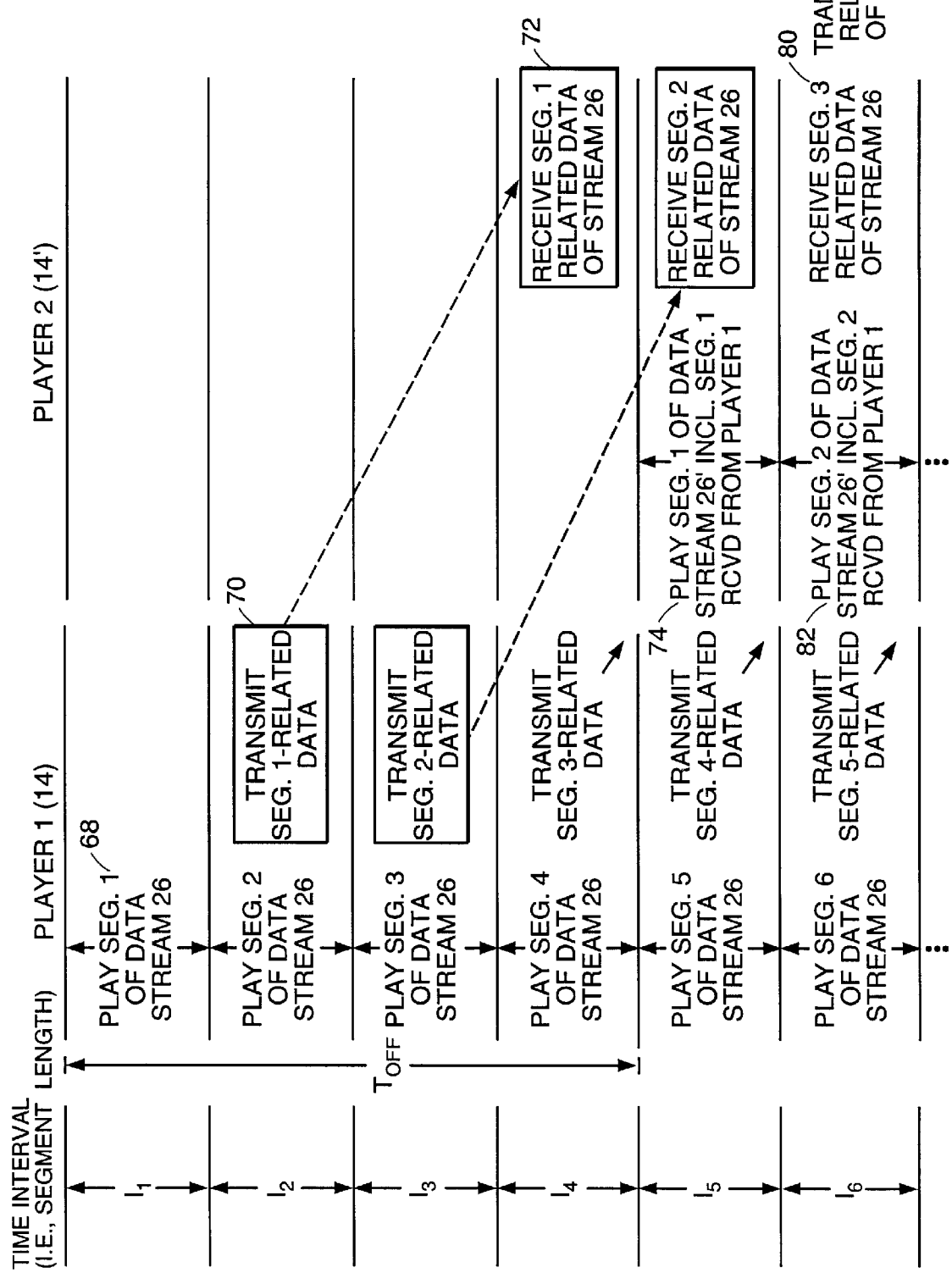
FIG. 4 is a flow diagram illustrating an embodiment of an exemplary process by which two users achieve musical collaboration according to the principles of the invention.

FIG. 4 illustrates an exemplary process by which the players using the music system 10 engage in the musical collaboration. To simplify the following description, the process is illustrated for six time intervals (here, $I_1$ through $I_6$, using two of the players shown in FIG. 1 (i.e., players 1 and 2), although it is to be understood that any number of players can participate in the musical collaboration. Each time interval, $I_1$ through $I_6$, corresponds to the length of time to play a segment of the musical data stream 26. The start of each time interval coincides with the end of the previous time interval.

In accordance with the principles of the invention, the computers 14, 14' stagger the playing of the musical data streams 26, 26' to the players 1 and 2, respectively, to produce a temporal offset, $t_{OFF}$, between the musical data streams 26, 26'. For example, computer 14 plays (step 68) segment 1 of the musical data stream 26 during the time interval $I_1$ to player 1, and computer 14' plays (step 74) segment 1 of the musical data stream 26' during the time interval $I_5$ to player 2. In this example, the temporal offset, $t_{OFF}$, between player 1 and player 2 is equal to four time intervals (i.e., the difference in time between the start of time interval $I_1$ and the start of time interval $I_5$). The staggering of musical data streams 26, 26' places each player at a different temporal position in the musical collaboration than every other player. For example, during the time interval $I_5$, player 1 is hearing segment 5 of the musical collaboration, while player 2 is hearing segment 1.

Play of the musical data streams 26, 26' continues uninterrupted and remains staggered throughout the musical collaboration; that is, the temporal offset, $t_{OFF}$, established between segments 1 of the musical data streams 26, 26' is substantially maintained for each pair of corresponding subsequently played segments. Thus, for example, the temporal offset between segments 2 of the musical data streams 26 and 26', which is the difference in time between the start of time intervals $I_6$ and $I_2$, is substantially the same as the temporal offset between segments 1.

During the play of segment 1 of the musical data stream 26 to player 1, player 1 can make changes to the musical data of segment 1. After the end of the time interval $I_1$, the computer 14 transmits (step 70) the segment 1-related data modifications to the computer 14'. In general, transmissions of such modifications occur at the start of the subsequent time interval. Player 2 (14') receives (step 72) the modifications at some point prior to the start of time interval $I_5$. According to the principles of the invention, the modifications arrive before the computer 14' plays segment 1 of the musical data stream 26' in time interval $I_5$. Consequently, the computer 14' can incorporate the modifications received from computer 14 into segment 1 of the musical data stream 26'. Then when player 2 hears segment 1 of the musical data stream 26', he/she hears the music played by player 1.

As shown in FIG. 4, similar processes occur for each of the subsequent segments (e.g., segments 2, 3, 4, 5, 6, etc.) of the musical data streams 26 and 26'. As shown, the actions performed by computer 14' during the time interval $I_6$ are representative of the actions performed by each computer 14 during each time interval of the musical collaboration. During time interval $I_6$, the computer 14' transmits (step 78) to another user modifications made by the player to the previous segment (here, segment 1), receives (step 80) musical data modifications from another user (here, player 14) corresponding to a segment to be played (here, segment 3), and plays (step 82) musical data corresponding to the current segment (here, segment 2).

When four players are participating in the musical collaboration, as shown in FIG. 1, the staggering of the musical data streams occurs across the four corresponding musical data streams 26, 26', 26", 26'". The following Table 1 illustrates an exemplary staggering sequence produced by the computers 14, 14', 14", and 14'". Times $t_0$, $t_1$, $t_2$, and $t_3$ represent those moments when a different one of the computers 14 plays segment 1 of the respective musical data stream 26. Arbitrary time values are given to those moments (e.g., $t_1$=2.0 seconds). Each time $t_1$, $t_2$, and $t_3$ is with reference to $t_0$, which is when computer 14 plays segment 1 of the musical data stream 26.

TABLE 1

| | | Temporal Position of Each Player in the Musical Collaboration (in segments) | | | |
|---|---|---|---|---|---|
| PLAYER No. | Data Stream | At time $t_0 = 0$ s | At time $t_1 = 2.0$ s | At time $t_2 = 4.0$ s | At time $t_3 = 6.0$ s |
| 1 | 26 | SEG. 1 | SEG. 5 | SEG. 9 | SEG. 13 |
| 2 | 26' | | SEG. 1 | SEG. 5 | SEG. 9 |
| 3 | 26" | | | SEG. 1 | SEG. 5 |
| 4 | 26'" | | | | SEG. 1 |

In Table 1, the exemplary staggering sequence has computer 14 playing segment 1 of musical data stream 26 to player 1 at time $t_0$, computer 14' playing segment 1 of musical data stream 26' to player 2 at time $t_1$, computer 14" playing segment 1 of musical data stream 26" at time $t_2$, and computer 14'" playing segment 1 of musical data stream 26'" at time $t_3$. Note that in the time between when computer 14 plays segment 1 and computer 14' plays segment 1 (i.e., the time represented by interval $[t_0, t_1]$), the computer 14 plays segments 2, 3, and 4 of musical data stream 26 to player 1.

In the example shown in Table 1, the staggered play of the musical data streams 26 produces a two second temporal offset between each pair of neighboring players. As used throughout the description, neighboring players are adjacent in the staggering sequence; that is, each player may be considered to occupy a temporal position in the staggered sequence of play. Player 1 is first in the staggering sequence, player 2 is next, then player 3, followed by player 4. Accordingly, player 1 neighbors player 2, player 2 neighbors players 1 and 3, player 3 neighbors players 2 and 4, and player 4 neighbors player 3. When the computers 14 circulate musical data modifications in a feedback loop fashion, as described in more detail below, players 1 and 4 are also neighbors, and a two-second temporal offset exists between the playing of the musical data streams 26''' and 26 to players 4 and 1, respectively. To distinguish between the two neighbors of a given player, an upstream neighbor is the player who hears a particular segment before the given player, and a downstream neighbor is the player who hears the particular segment after the given player.

A result of the staggered playing is that each player hears a different portion of the musical collaboration at any given time than every other player. At time $t_3$, for example, player 1 hears segment 13 of the musical data stream 26, while player 2 hears segment 9 of the musical data stream 26', player 3 hears segment 5 of the musical data stream 26'', and player 4 hears segment 1 of the musical data stream 26'''.

To interact with the playing music, each player modifies the musical data in the musical data stream 26 as the respective computer 14 plays that musical data stream 26 to that player. That computer 14 then transmits such musical data modifications over the network 22 to at least one other player, typically a downstream neighboring player. In one embodiment, the modifications made by a player must satisfy certain criteria before such modifications are permitted to alter the musical data and be transmitted to another player. For example, such criteria might include requiring that the modifications produce music that is sufficiently "pleasing" as defined by rules set forth in the software.

Modifications made by one player are not heard by another player until the data reflecting those modifications are transmitted from that one player to the other player, incorporated into the locally playing musical data stream by that other player, and then played to that other player when the locally playing musical data stream reaches that modified section of music. Typically, that other player receives the modifications before the locally playing musical data stream reaches that modified section of music, as described in more detail below. Conceivably the modifications may not arrive until after the receiving computer 14 has partially or completely played the section of music for which the modifications are intended. When the section of music is partially played, the computer 14 can employ a technique that blends the late modifications with any musical data that remains to be played for that same section of music. When the musical data modifications arrive after the corresponding section of music completes playing, the computer 14 does not play these modifications. However, the temporal offsets between the players are specifically designed to be large enough to prevent such late-arriving modifications.

The musical data modifications that are transmitted over the network 22 in one embodiment are the modified musical data of the entire modified segment. The receiving computer 14 substitutes this modified segment for the corresponding segment in the locally played musical data stream. For example, if player 1 modifies the musical data of segment 1, the computer 14 transmits the musical data of modified segment 1 to player 2, and the computer 14' substitutes this modified segment 1 for segment 1 of the locally played musical data stream 26'.

In another embodiment, the modifications transmitted to player 2 are not the actual modified segment, but those portions of the musical data of the modified segment that are different from the musical data before the player made the modifications. Hereafter, such portions are referred to as delta signals. The receiving computer uses the delta signals to alter the musical data of the locally played musical data stream to correspond to the musical data as modified by the transmitting player. Thus, instead of substituting the modified segment, as in the previous embodiment, the receiving computer uses the delta signals to transform the local segment into the modified segment. An advantage of this embodiment is that transmitting the delta signals use less network bandwidth than transmitting the entire modified segment.

Examples of modifications include deleting and adding tracks of music to the musical collaboration and modifying existing musical tracks. Such modifications involve editing the musical data in the musical data stream 26 in accordance with format of that musical data. Techniques for modifying MIDI and audio data are known in the art. Techniques for modifying musical data of various proprietary formats are described in U.S. Pat. Nos. 5,627,335 and 5,763,804, issued to Rigopulos et al., and allowed U.S. patent application, Ser. No. 08/788,398, by Rigopulos et al., all entitled "Real-Time Music Creation System," and all incorporated by reference herein.

Again using Table 1, the following exemplary sequence of musical play illustrates the process of achieving musical collaboration. In this example, each computer 14 directs transmission of the musical data modifications to the downstream neighboring player after completing play of segment 1. Assume player 1 lays down a guitar track in segment 1 starting at time $t_0$. Player 2 can add a piano track to segment 1 while hearing the guitar music when the computer 14' plays segment 1 to player 2 starting at time $t_1$. At time $t_2$, when the computer 14'' starts playing segment 1 to player 3, player 3 can then delete the guitar track laid down by player 1 while listening to the piano music produced by player 2. Player 4 can add piano music to the piano track laid down by player 2 as computer 14''' starts playing segment 1 at time $t_3$. Note that player 4 hears the piano music of player 2, but does not hear the guitar music played by player 1 because player 3 deleted the guitar track before sending the segment 1 modification data to player 4. Thus, the staggered manner in which such modifications are circulated to each player in the musical group, coupled with the ability of each player to modify the musical data, produces the result that every player typically hears a different version of the musical collaboration than every other player.

In this previous example, each receiving computer 14 receives the segment 1 modifications from the upstream neighboring player in time to incorporate such modifications into segment 1 of the locally played musical data stream 26. In one embodiment, the music system 10 ensures that the downstream neighboring player receives the modifications in time by setting the temporal offset between staggered musical data streams 26 greater than the maximum latency of the network 22. Consequently, modifications of the musical data arrive at the receiving computer with sufficient time to become incorporated into the locally played musical data stream played.

In one embodiment, the latency of the network is the time required for musical data to travel from one computer to another computer. In another embodiment, described below in connection with FIG. 6, network latency is the time required for a computer to receive musical data over the network in response to a request for that musical data. Techniques for determining latencies in a network are known in the art. One such technique uses a "ping" data packet to measure the round-trip time for that data packet to travel across the network between the sending and receiving computers.

Ensuring that the musical modifications arrive on time to become incorporated into the locally played musical data stream produces an impression in each downstream player that he/she is concurrently playing music with each upstream player, although that upstream player has moved onto a subsequent portion of the musical collaboration by the time the downstream player receives the upstream player's modifications. In the previous example above, player 2 experiences a sensation of playing concurrently with player 1, player 3 senses concurrent play with both players 1 and 2, and player 4 senses concurrent play with players 1, 2, and 3.

One embodiment of the invention takes advantage of the repetitious nature of many musical pieces (e.g., song forms having repeating verses, choruses, etc.) to achieve an impression in each player that he/she is concurrently engaging in real-time musical interaction with every other player in the musical group. In this embodiment, each computer 14 automatically plays the respective musical data stream 26 in a continuous, repetitious loop. Thus, after playing the last segment in the respective musical data stream 26 (e.g., segment 16 in FIG. 3), each computer 14 automatically continues playing with the first segment (i.e., segment 1). Here, automatic play means that once each computer starts playing the respective musical data stream, that computer continues to play that musical data stream for a predetermined number of loops. Players cannot pause or stop and resume the play of the musical data stream. This automatic play ensures that the computers 14 can maintain the temporal offsets established initially for the staggered musical data streams.

Because each musical data stream 26 is repetitious in character, continuing with the first segment of the stream immediately after playing the last segment produces a harmonious transition in the music being played to the player. Accordingly, this local repetitious playing of the musical data stream 26 enables the formation of a feedback loop wherein the musical data modifications produced by the last player in the staggering sequence, here player 4, are sent to the first player, here player 1. Each computer 14 can repeat the looping of the respective musical data stream 26 for a predetermined number of times. When the looping of the musical data stream ceases, each computer can transition into a different musical data stream, e.g., representing music played at a different key.

Again, as described above, the playing of such musical data streams 26, 26', 26'', 26''' are staggered, with each player having the ability to modify the respective musical data stream as that musical data stream is played. Table 2 illustrates an exemplary staggering sequence between repetitiously played musical data streams. The staggering sequence is similar to the sequence shown in Table 1, with an additional aspect of locally looping the playing of each musical data streams.

TABLE 2

| PLAYER No. | Data Stream | Temporal Position of Each Player in the Musical Collaboration (in segments) | | | | |
| --- | --- | --- | --- | --- | --- | --- |
| | | At time $t_0 = 0$ s | At time $t_1 = 2$ s | At time $t_2 = 4$ s | At time $t_3 = 6$ s | At time $t_4 = 8$ s |
| 1 | 26 | SEG. 1 | SEG. 5 | SEG. 9 | SEG. 13 | SEG. 1'''' |
| 2 | 26' | | SEG. 1' | SEG. 5' | SEG. 9' | SEG. 13' |
| 3 | 26'' | | | SEG. 1'' | SEG. 5'' | SEG. 9'' |
| 4 | 26''' | | | | SEG. 1''' | SEG. 5''' |

Figure 5:
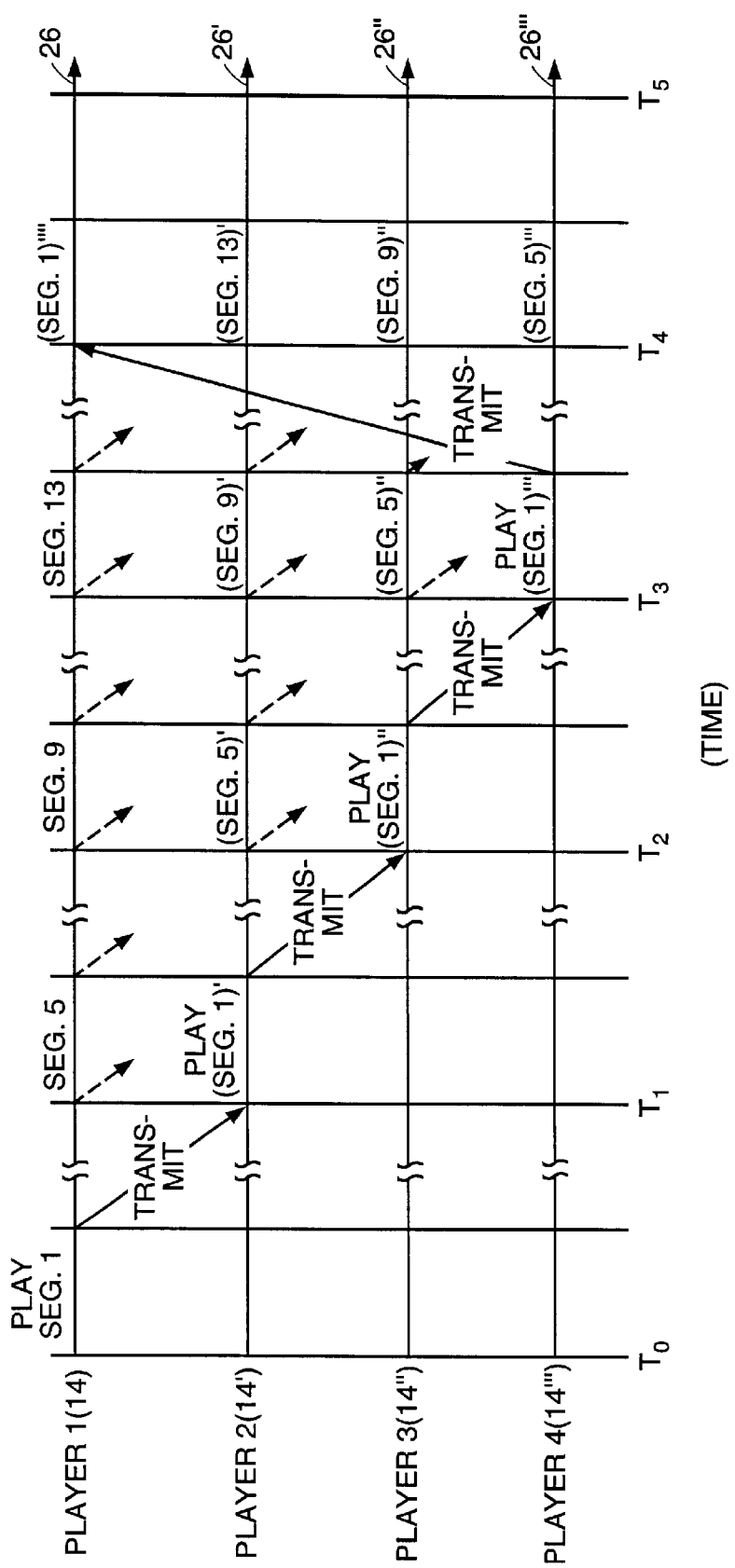
FIG. 5 is a timeline diagram demonstrating local looping of the musical data streams at each player and the circulation of musical data segments among the players.

FIG. 5 corresponds to the staggering sequence shown in Table 2 and illustrates exemplary processes of looping the locally played musical data streams 26 and circulating musical data modifications among the players. The process shown in FIG. 5 focuses on the evolution of segment 1 as modifications to segment 1 circulate among the four players. Every other segment in the musical collaboration undergoes similar treatment as segment 1.

As shown in FIG. 5, computer 14 plays segment 1 of musical data stream 26 to player 1 at time $t_0$ and again at time $t_4$. The notation for segment 1 at time $t_0$, (i.e., Seg. 1) differs from the notation of segment 1 at time $t_4$, (i.e., Seg. 1''''), to indicate that the musical data of these segments differ, although both are segment 1 of the musical data stream 26. A circumstance under which the musical data of such segments (i.e., Seg. 1 and Seg. 1'''') do not differ is when none of the players make any modifications to segment 1 between time $t_0$ and time $t_5$.

Typically, one or more of the players modifies the musical data of segment 1. In the example shown in FIG. 5, every player makes a modification to segment 1. After receiving Seg. 1 from player 1 before time $t_1$, player 2 modifies Seg. 1 to produce Seg. 1'. Player 3 subsequently modifies Seg. 1' to produce Seg. 1'' and player 4 modifies Seg. 1'' to produce Seg. 1'''. Player 4 completes one circulation of segment 1 by transmitting Seg. 1''' (or delta signals) to player 1. Modifications by player 1 to Seg. 1''' produce Seg. 1''''. Consequently, the music played to a given player during successive loops of the musical data stream 26 differs from loop to loop, depending upon the modifications made by each of the players during the course of playing each loop.

Unlike embodiments that do not employ a looping (repeating) musical form and looping musical data streams among the players, embodiments with looping musical forms, as described in FIG. 5, achieve symmetry; that is, every player becomes both an upstream and a downstream player with respect to all other players. Accordingly, looping musical forms provide upstream players (e.g., player 1) with the sensation of playing concurrently with downstream players (e.g., players 2, 3, and 4). The looping attains this sensation because the modifications produced by these downstream players, if any, circulate back to upstream players. In FIG. 5, this circulation occurs when the downstream computer 14''' transmits player 4's modifications to the musical data stream 26''' to player 1. This sensation occurs although the downstream players have moved onto subsequent segments of the musical collaboration by the time that player 1 receives the Seg. 1''' modifications, and although the downstream players do not hear player 1's present modifications until the downstream players receive, if ever, such present modifications over the network 22.

Figure 6:
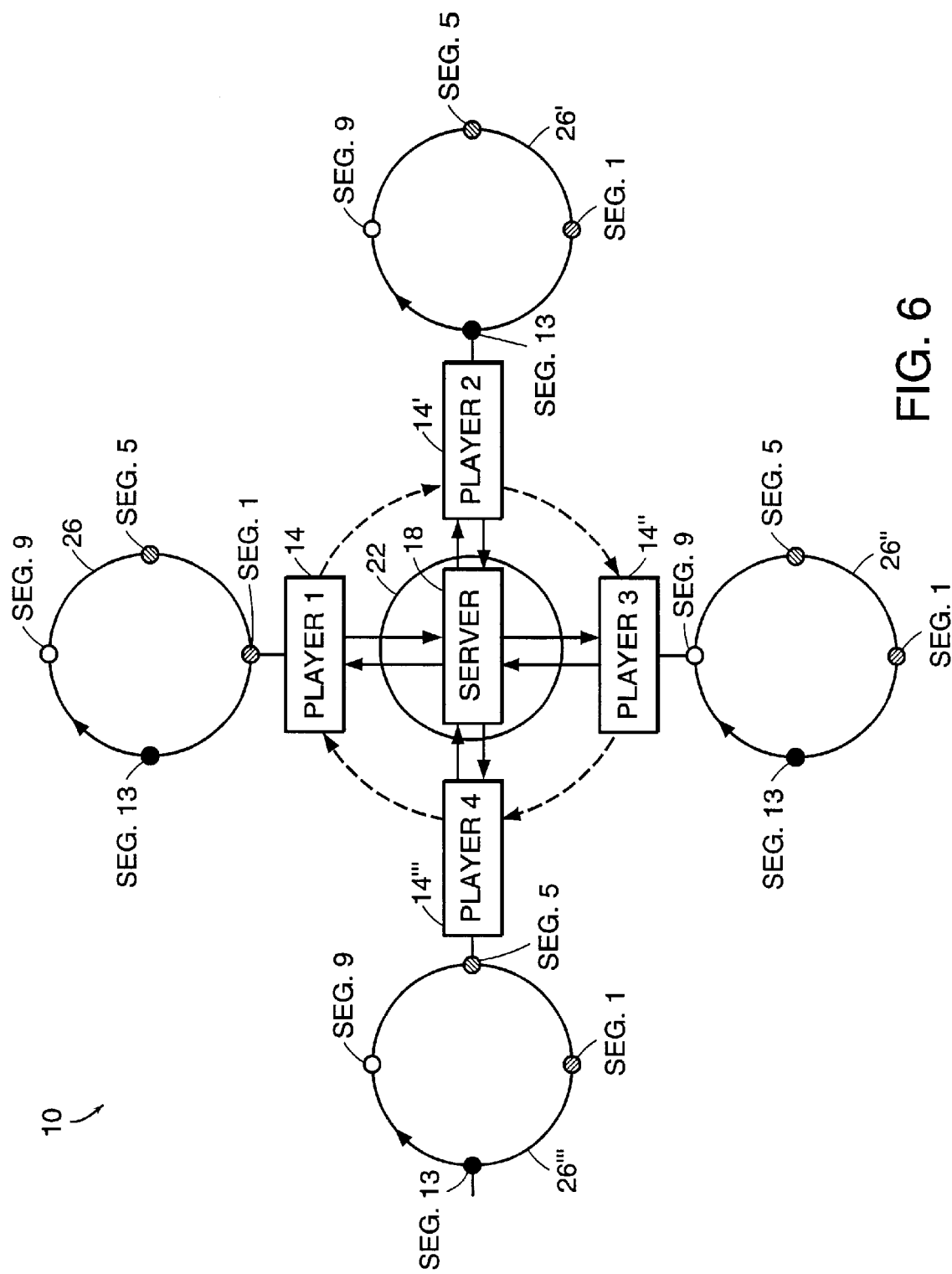
FIG. 6 is a block diagram of an embodiment of the music system of FIG. 1 having a server in communication with the computer systems to implement the functionality of the invention.

FIG. 6 shows an embodiment of the music system 10 of FIG. 1, in which each computer 14 is in communication with a server 18 over the network 22 in a client-server arrangement. In this embodiment, the computers 14 are referred to as clients 14. Connections between each client 14 and the server 18 can be established using a variety of communication protocols (e.g., TCP/IP, IPX, SPX, NetBIOS, Ethernet, RS232, and direct asynchronous connections).

The server 18 includes a central processor and memory 34 for storing programs and/or data. One or more software programs installed on the server 18 interface with the software programs installed on the clients 14. In general, the software programs on the server 18 and the clients 14 interact to implement the functionality of the music system 10. The server 18 also stores a complete musical data stream corresponding to the musical collaboration produced by the players. As the musical collaboration evolves, so does the stored musical data stream. In another embodiment, the functionality of the server 18 resides on the same physical computer system as one of the clients 14.

Figure 7:
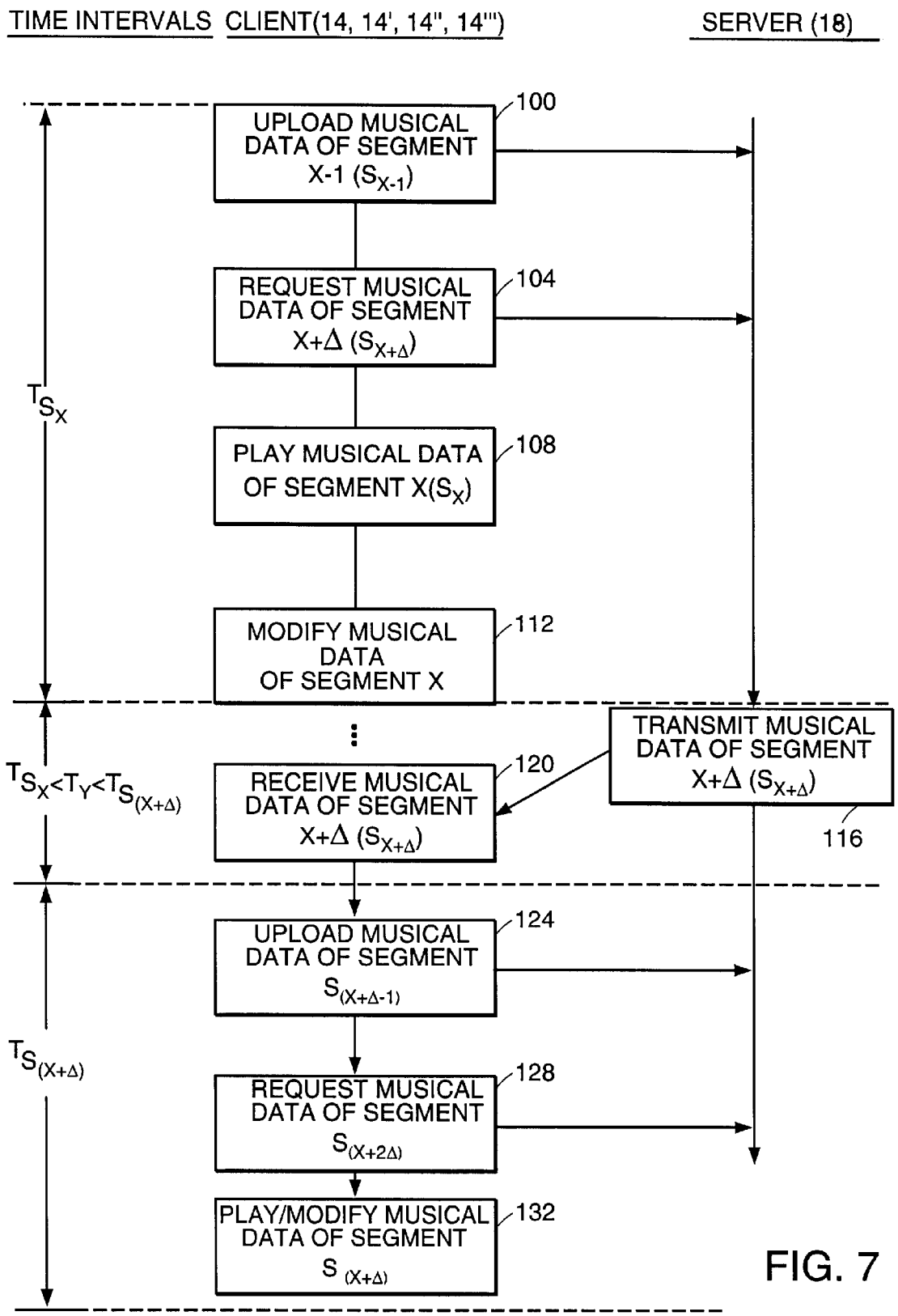
FIG. 7 is a flow chart of an embodiment of a process used by the computer systems and the server to produce musical collaboration according to the principles of the invention.

FIG. 7 shows an exemplary process by which each of the clients 14 communicates with the server 18 to achieve musical collaboration as described above. To start the musical collaboration, each player launches the appropriate software application from the respective client 14.

Launching the software program initiates communication with the server 18 over the network 22. The server 18 determines which players want to participate in the musical collaboration and establishes a musical group consisting of those players. The server 18 also places the players in a sequential order and uses that sequential order to stagger the playing of the musical data streams to the players as described above. To produce the sequential order, the server 18 in one embodiment uses the order in which requests to start the musical collaboration reach the server 18 from the clients 14. In FIG. 6, the sequential order is shown using dashed, arced arrows.

The server 18 determines the length of the desired temporal offset with which to stagger the musical data streams played by the clients 14 and coordinates with the clients 14 to implement the staggered play of those musical data streams. Throughout the musical collaboration, the server 18 maintains the temporal offset between the musical data streams. Because each client 14 may "drift," that is, the internal time clock of that client may slow or accelerate with respect to the other clients, the server 18 employs a synchronization technique to ensure that each client remains at the appropriate temporal location with respect to every other client. The server 18 can employ any one of a number of synchronization techniques. For example, the server 18 can periodically check the clocks of each of the clients 14 and send time adjustment messages to each client. Each client responds to the time adjustment message by adjusting its local clock to that time. Another technique is for the server 18 to compute the latency of the connection to each client 14 and then take into account the computed latency for a particular client when sending a time adjustment message to that client.

Referring to FIG. 7, shown are three exemplary time intervals, $t_{Sx}$, $t_y$, and $t_{S(x+\Delta)}$. The time intervals are not equal in duration; $t_{Sx}$ and $t_{S(x+\Delta)}$ are time intervals during which one segment of the musical data stream is played, segment $S_x$ and segment $S_{(x+\Delta)}$, respectively, and $t_y$ is a time interval during which multiple segments are played. Because of the staggered playing of the musical data streams, at any given time segment $S_x$ represents a different segment for each of the clients 14. For example, during time interval $t_{Sx}$ segment $S_x$ can represent segment 14 for client 14, segment 10 for client 14', segment 6 for client 14", and segment 2 for client 14'''. This is also the case for segment $S_{(x+\Delta)}$.

At the start of time interval $t_{Sx}$, during the playing of segment $S_x$, each client 14 uploads (step 100) musical data corresponding to the previous segment (i.e., segment $S_{x-1}$) to the server 18. Typically, the server 18 receives the uploaded musical data after the time interval, here $t_{Sx}$, elapses. In one embodiment, the musical data transmitted to the server 18 are delta signals related to any modifications made by the player to the musical data of segment $S_{x-1}$. In another embodiment, the transmitted musical data represent the entire modified segment $S_{x-1}$.

Upon receiving this modification data, the server 18 modifies the stored version of segment $S_{x-1}$ of the musical collaboration, accordingly. For example, building upon the previous example illustrating the various segments represented by $S_x$, the server 18 receives modification data segments $S_{x-1}$, namely, segment 13 from client 14, segment 9 from client 14', segment 5 from client 14", and segment 1 from client 14'''. The server 18 then modifies the stored musical data corresponding to each of these segments. In one embodiment, at the appropriate time the server 18 sends this segment $S_x$ to the downstream neighbor of the transmitting client 14. In this embodiment, each client 14 stores musical data for those segments only that are to be played in the near future. In another embodiment, the server 18 subsequently sends the segment $S_x$ to every other client 14. In this case, each client 14 stores the entire musical data stream of the collaboration.

Each client 14 also sends (step 104) a request to the server 18 for musical data corresponding to an upcoming segment (i.e., $S_{(x+\Delta)}$). During the time interval $t_{Sx}$, each client 14 also plays (step 108) the segment $S_x$ to the respective player. Each player can also modify (step 112) the musical data of that currently playing segment $S_x$. At the start of play of the next segment $S_{x+1}$, (each client 14 uploads the musical data corresponding to segment $S_x$.

During time interval $t_y$, the server 18 transmits (step 116) the musical data or delta signals associated with the appropriate segment $S_{(x+\Delta)}$ to each client 14. The server 18 transmits such musical data or delta signals in response to the requests issued by the clients 14 during time interval $t_{Sx}$. In another embodiment, the server 18 automatically transmits the corresponding musical data or delta signals at a predetermined time. Accordingly, for this embodiment the clients 14 do not need to specifically request a segment.

According to the principles of the invention described above, each client 14 receives (step 120) this data associated with segment $S_{(x+\Delta)}$ in time for that client 14 to incorporate the received data into the appropriate segment (i.e., segment $S_{(x+\Delta)}$) of the locally playing musical data stream.

During the time interval $t_{S(x+\Delta)}$, each client 14 uploads (step 124) the musical data associated with the previous segment $S_{(x+\Delta-1)}$ and requests (step 128) musical data corresponding to another upcoming segment, $S_{(x+\Delta+\Delta)}$. The upcoming segment is far enough in advance of the presently playing segment in the musical data stream to allow enough time for the requesting client to receive musical data in reply from the server 18 before the time to play that upcoming segment arrives. In step 132, each client 14 plays and modifies the musical data of segment $S_{(x+\Delta)}$.

Figure 8:
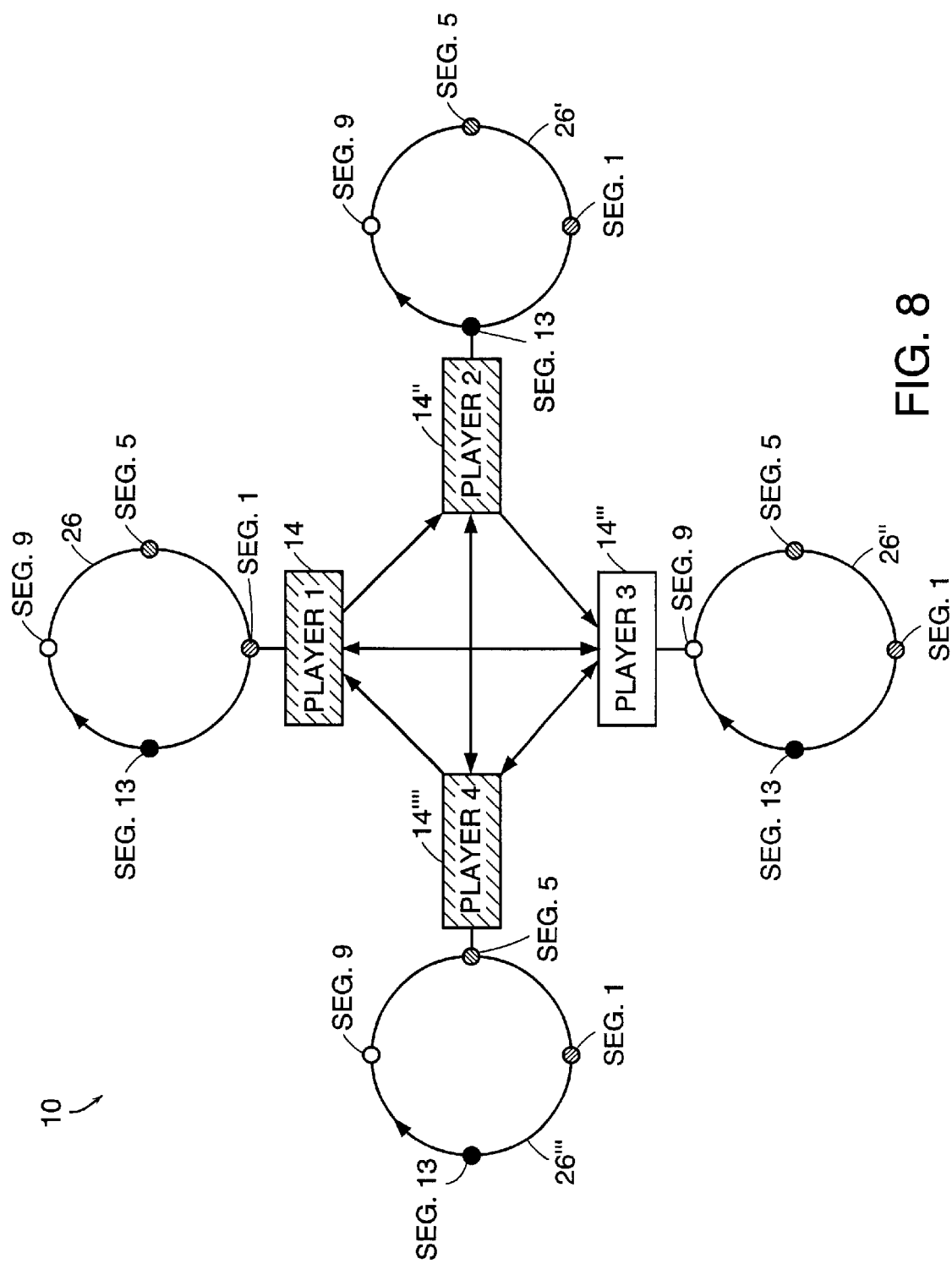
FIG. 8 is a block diagram of another embodiment of the music system of FIG. 1 in which the computer systems are in communication with each other without a server.
Figure 9:
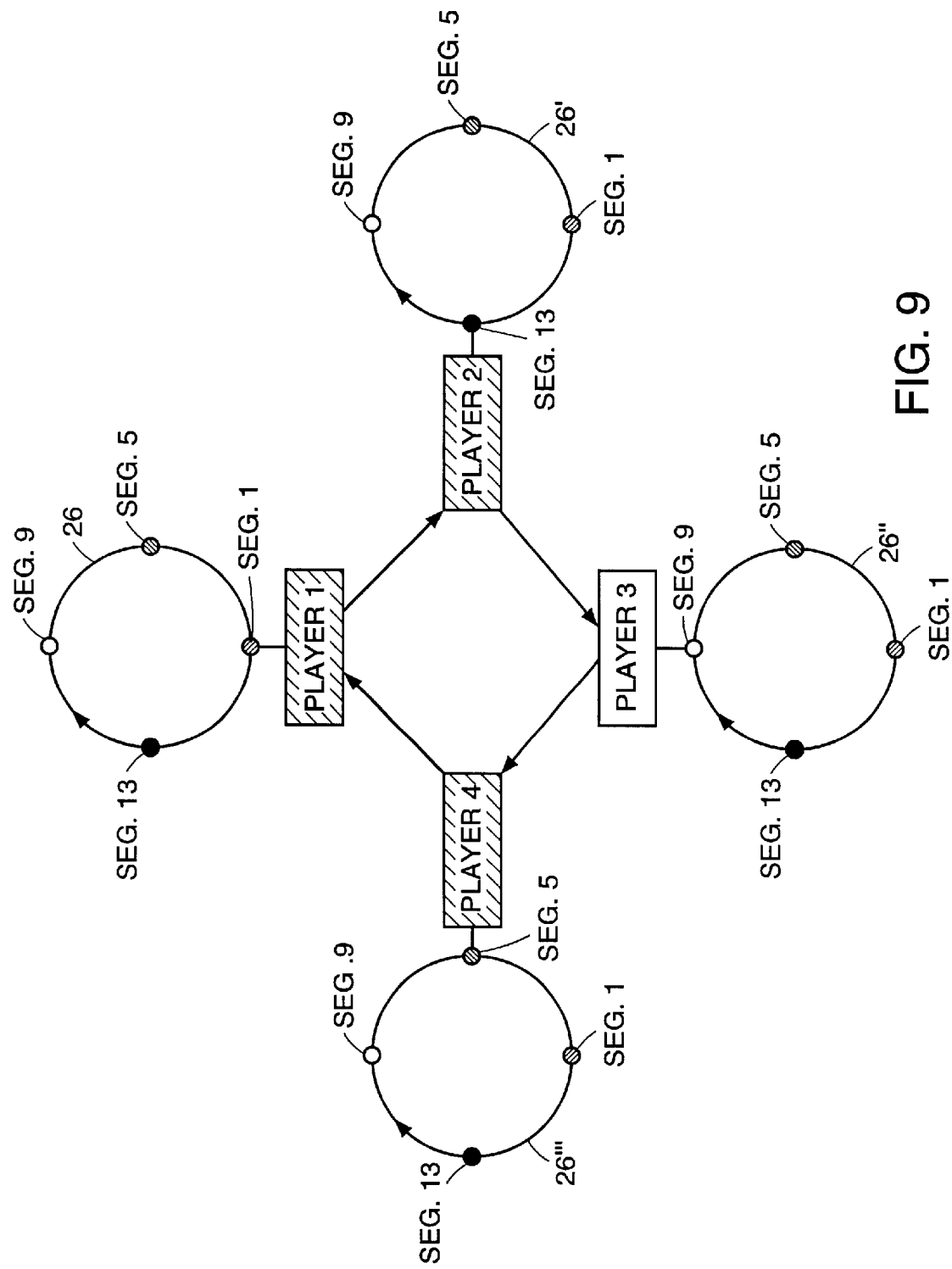
FIG. 9 is a block diagram of another embodiment of the music system of FIG. 1 in which the computer systems are organized in a daisy chain topography.

FIGS. 8 and 9 illustrate exemplary embodiments of the music system 10 which use a different network topology to practice the invention than that shown in FIG. 6. In FIG. 8, each computer 14 is in communication with every other computer 14 in a peer-to-peer relationship. At the start of the musical collaboration, the computers 14 negotiate with each other to establish the sequential order for staggering the play of the musical data streams. Upon completing the play of a segment of musical data, each computer 14 can transmit the modifications to the downstream neighboring computer 14 only or broadcast such modifications to every other computer 14.

For the embodiment in which each computer 14 transmits to the downstream neighbor only, each computer 14 transmits an entire segment (i.e., not delta signals). Accordingly, the complete musical data stream representing the current content of the musical collaboration is distributed across all computers and is not known by any one computer. In the embodiment in which each computer 14 broadcasts the segment to every other computer, the transmitted segment can be either the entire segment or delta signals. In this case, each computer 14 stores a complete version of the musical data stream representing the collaboration and updates that version according to the modifications received.

FIG. 9 shows the computers 14 organized in a daisy chain. In this embodiment, the order of the computers 14 in the daisy chain determines the sequential order for staggering play of the musical data streams 26. Upon completion of a segment, each computer 14 transmits the musical data modifications to the downstream neighboring computer 14. Again, each computer 14 transmits an entire segment and the current content of the musical collaboration is distributed across all of the computers 14.

The present invention may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of the invention, it will now become apparent to one of skill in the art that other embodiments incorporating the concepts of the invention may be used. Although the described embodiments relate to the field of music, the principles of the invention can extend to other areas that involve near real-time collaboration by two or more users connected to a network, such as, for example, computer gaming. Also, although some of the described embodiments represent and transmit musical data in terms of segments, other embodiments may not represent the musical data as segments, e.g., embodiments in which transmission of the musical data modifications over the network occurs continuously as the players make the modifications. Therefore, the invention should not be limited to certain embodiments, but rather should be limited only by the spirit and scope of the following claims.

What is claimed is:

1. A method for achieving musical collaboration by a plurality of users, each user operating a computer system that is connected to a network, the method comprising the steps of:
   (a) playing to the user of a computer system a stream of musical data representing a musical collaboration of the users;
   (b) allowing the user of the computer system to modify the musical data of the musical collaboration as those musical data are played to the user; and
   (c) while t he musical data are being played to the user and while the user is modifying the musical data being played, automatically and continually transmit ting by the computer system musical data modifications made by the user to another computer system over the network.

2. The method of claim 1 wherein the step of staggering said playing includes separating any two users by a temporal offset that exceeds the maximum time required to transmit musical data modifications from one user to another user over the network.

3. The method of claim 1 wherein the step of playing said musical data stream occurs repetitiously.

4. The method of claim 1 wherein the step of playing said musical data stream occurs automatically.

5. The method of claim 1 further comprising the step of dividing the musical data stream into a sequence of temporally ordered musical data segments.

6. The method of claim 5 wherein each musical data segment is equal in temporal length as every other musical data segment in the musical data stream.

7. The method of claim 1 wherein the step of allowing each user to modify the musical data includes adding musical data by that user.

8. The method of claim 1 wherein the step of allowing each user to modify the musical data includes deleting musical data by that user.

9. The method of claim 1 wherein the step of transmitting includes transmitting the musical data modifications made by the user to every other user.

10. The method of claim 1 wherein the step of transmitting includes transmitting the musical data modifications made by the user to another computer system through a server.

11. The method of claim 1 further comprising the step of synchronizing the users to maintain the staggered playing throughout the musical collaboration.

12. The method of claim 1 further comprising playing a stream of musical data representing the musical collaboration to each other user and staggering said playing of the musical data streams such that each user is located at a different time in the musical collaboration than every other user.

13. The method of claim 1 wherein each user is allowed to modify any portion of the musical data of the musical data stream representing the musical collaboration as that portion of the musical data is played to that user.

14. The method of claim 1 wherein each user is allowed to modify the musical data contributed to the musical collaboration by another user.

15. The Method of claim 1 wherein the automatic transmission of the musical data modifications occur at predetermined intervals.

16. The method of claim 1 wherein the musical data modifications transmitted over the network are associated with a segment of the musical data stream.

17. A method for achieving collaboration on a task by a plurality of users connected by a network, the method comprising the steps of:
   (a) outputting a stream of data representing the collaboration to each user;
   (b) allowing each user to modify the data of the data stream as that data are output to that user; and
   (c) while the stream of data is being output to each of the users and while one of the users is modifying the stream of data being output to that user, automatically and continually transmitting data modifications made by that one of the users to another user over the network.

18. The method of claim 12 further comprising staggering said outputting of the data streams such that each user is located at a different time in the collaboration than every other user.

19. A system for achieving musical collaboration by a plurality of users connected by a network, comprising:
   a plurality of computers connected by a network, each computer being operated by one of the users and including:
   an output system playing a stream of musical data representing the musical collaboration to a user of that computer,
   an input system by which the user of that computer modifies the musical data as the output system plays that musical data, and
   a transmitter automatically and continually transmitting the musical data modifications to another computer over the network while the musical data are being played to the user and while the user is modifying the musical data being played.

20. The system of claim 19 wherein the musical data streams are staggered by a temporal offset that exceeds the maximum time required to transmit musical data from one user to another user over the network.

21. The system of claim 19 wherein each musical data stream is repetitiously output by the respective output system.

22. The system of claim 19 wherein each musical data stream is automatically output by the respective output system.

23. The system of claim 19 each computer further comprises a divider subdividing the respective musical data stream into a sequence of temporally ordered musical data segments.

24. The system of claim 17 wherein each musical data segment is equal in temporal length to every other musical data segment in the musical data stream.

25. The system of claim 19 further comprising a server in communication with each computer, the server receiving musical data modifications from each user and forwarding such modifications to at least one other user.

26. The system of claim 19 wherein the input system includes a MIDI instrument.

27. The system of claim 19 wherein the musical data modifications are delta signals.

28. The system of claim 19 wherein the output system includes a MIDI synthesizer.

29. The system of claim 19 further comprising a synchronizer synchronizing the users to maintain the staggered playing throughout the musical collaboration.

30. The system of claim 13 wherein the computers stagger the playing of the musical data streams such that each computer plays musical data located at a different time in the musical collaboration than every other computer.

31. A method for achieving musical collaboration by a plurality of users connected by a network, the method comprising the steps of:

(a) playing a stream of musical data representing the musical collaboration to each user;

(b) staggering said playing of the musical data streams to any two users by a temporal offset that exceeds the maximum time required to transmit musical data modifications from one user to another user over the network, such that each user is located at a different time in the musical collaboration than every other user;

(c) allowing each user to modify the musical data of the musical data stream as those musical data are played to that user; and (d) transmitting musical data modifications made by one of the users to another user over the network.

32. A method for achieving musical collaboration by a plurality of users connected by a network, the method comprising the steps of:

playing a stream of musical data representing the musical collaboration to each user;

dividing each musical data stream into a sequence of temporally ordered musical data segments that are each equal in temporal length as every other musical data segment in the musical data stream;

staggering said playing of the musical data streams such that each user is located at a different time in the musical collaboration than every other user;

allowing each user to modify the musical data of the musical data stream as those musical data are played to that user; and transmitting musical data modifications made by one of the users to another user over the network.

33. A system for achieving musical collaboration by a plurality of users connected by a network, comprising:

a plurality of computers connected by a network, each computer including:

an output system playing a stream of musical data representing the musical collaboration to a user of that computer, an input system by which the user of that computer modifies the musical data as the output system plays that musical data, and a transmitter transmitting the musical data modifications to another computer over the network, wherein the computers stagger the playing of the musical data streams by a temporal offset that exceeds the maximum time required to transmit musical data from one user to another user over the network such that each computer plays musical data located at a different time in the musical collaboration than every other computer.

34. A system for achieving musical collaboration by a plurality of users connected by a network, comprising:

a plurality of computers connected by a network, each computer including:

an out put system playing a stream of musical data representing the musical collaboration to a user of that computer, a divider subdividing the respective musical data stream into a sequence of temporally ordered musical data segments that are equal in temporal length to every other musical data segment in the musical data stream, an input system by which the user of that computer modifies the musical data as the output system plays that musical data, and a transmitter transmitting the musical data modifications to another computer over the network, wherein the computers stagger the playing of the musical data streams such that each computer plays musical data located at a different time in the musical collaboration than every other computer.

* * * * *